(12) United States Patent
Fukunaga (10) Patent No.: US 8,962,171 B2
(45) Date of Patent: Feb. 24, 2015

(54) COVER

(75) Inventor: Miyuki Fukunaga, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/811,148

(22) PCT Filed: Jul. 20, 2011

(86) PCT No.: PCT/JP2011/004093
§ 371 (c)(1),
(2), (4) Date: Jan. 18, 2013

(87) PCT Pub. No.: WO2012/011275
PCT Pub. Date: Jan. 26, 2012

(65) Prior Publication Data

US 2013/0122343 A1 May 16, 2013

(30) Foreign Application Priority Data

Jul. 20, 2010 (JP) .................................. 2010-162650

(51) Int. Cl.
*H01M 2/10* (2006.01)

(52) U.S. Cl.
CPC .......... *H01M 2/1016* (2013.01); *H01M 2/1094* (2013.01)
USPC ....................................................... 429/100

(58) Field of Classification Search
None
See application file for complete search history.

(56) References Cited

U.S. PATENT DOCUMENTS

| | | | | |
|---|---|---|---|---|
| 5,115,931 A | * | 5/1992 | Dubach | 215/235 |
| 5,423,442 A | * | 6/1995 | Nozawa et al. | 215/235 |
| 2002/0134572 A1 | * | 9/2002 | Matsumura | 174/66 |
| 2002/0168566 A1 | * | 11/2002 | Ohtsuka et al. | 429/175 |

FOREIGN PATENT DOCUMENTS

| | | |
|---|---|---|
| GB | 1106128 A | 3/1968 |
| JP | 49-001252 A | 1/1974 |
| JP | 07-285568 A | 10/1995 |
| JP | 2000-150018 A | 5/2000 |
| JP | 2002-289171 A | 10/2002 |
| JP | 2002-329492 A | 11/2002 |
| JP | 2009-521369 A | 4/2009 |

OTHER PUBLICATIONS

Office Action issued by the Korean Patent Office in Korean Patent Application No. 10-2013-7004028 dated Feb. 26, 2014.
Office Action issued Jun. 3, 2014 in counterpart Japanese Application No. 2010-162650.
Communication dated Aug. 28, 2014, issued by the Korean Intellectual Property Office in counterpart Korean application No. 10-2013-7004028.
Office Action issued on Aug. 5, 2014 in counterpart Chinese Patent Application No. 201180035661.2.

\* cited by examiner

*Primary Examiner* — Patrick Ryan
*Assistant Examiner* — Jose Colucci Rios
(74) *Attorney, Agent, or Firm* — Sughrue Mion, PLLC (57) ABSTRACT

A battery cover includes first and second cover portions and a coupling portion that is arranged in a position lower than upper surfaces of the first and second cover portions, between the first and second cover portions. The coupling portion includes a connection portion that is fixed to the second cover portion and a hinge portion that is thinner than the connection portion. The hinge portion is provided such that hinge end portions on both sides are thicker than a hinge center portion. Each of the hinge end portions is formed such that a side end surface thereof is a curved surface which is gently inclined from the first cover portion to the second cover portion and that an upper surface thereof is formed into a substantially arc-shaped curved surface which is thinnest in its center and inclined upward to gradually become thicker from the center toward both support ends.

3 Claims, 13 Drawing Sheets

3D MODEL PRODUCIBLE COMBINATION  ▓▓▓ PERFORM COMPARISON

|   |        | Y       |         |         |         |         |
|---|--------|---------|---------|---------|---------|---------|
|   |        | 0mm     | 0.1mm   | 0.2mm   | 0.3mm   | 0.4mm   |
| X | 0mm    | ◉       | ○       | ○       | ○       | ○       |
|   | 0.1mm  | ○       | ×       | ×       | ×       | ×       |
|   | 0.2mm  | ○       | ×       | ×       | ×       | ×       |
|   | 0.3mm  | ○       | ×       | ×       | ◉       | ◉       |
|   | 0.4mm  | ○       | ×       | ×       | ○       | ○       |
|   | 0.6mm  | ○       | ○       | ◉       | ○       | ○       |
|   | 0.75mm | ○       | ○       | ○       | ○       | ○       |
|   | 1.5mm  | ○       | ○       | ○       | ○       | ◉       |

× : UNSUCCESSFUL VARIABLE FILLET    ○ : MODEL PRODUCIBLE

FIG. 12

COVER

CROSS REFERENCE TO RELATED APPLICATIONS

This application is a National Stage of International Application No. PCT/JP2011/004093, filed on Jul. 20, 2011, which claims priority from Japanese Patent Application No. 2010-162650, filed Jul. 20, 2010, the contents of all of which are incorporated herein by reference in their entirety.

TECHNICAL FIELD

The present invention relates to a cover that has a hinge portion between a first cover portion and a second cover portion.

BACKGROUND ART

Some batteries that are mounted in vehicles and the like have fuse units directly attached thereto. Since, when a battery post, a terminal portion of a fuse unit and the like of a battery are exposed, water and dust cause corrosion or the like, the top portion of a part to which the fuse unit of the battery is attached is generally covered with a battery cover, which is a cover (see patent document 1).

Figure 1:
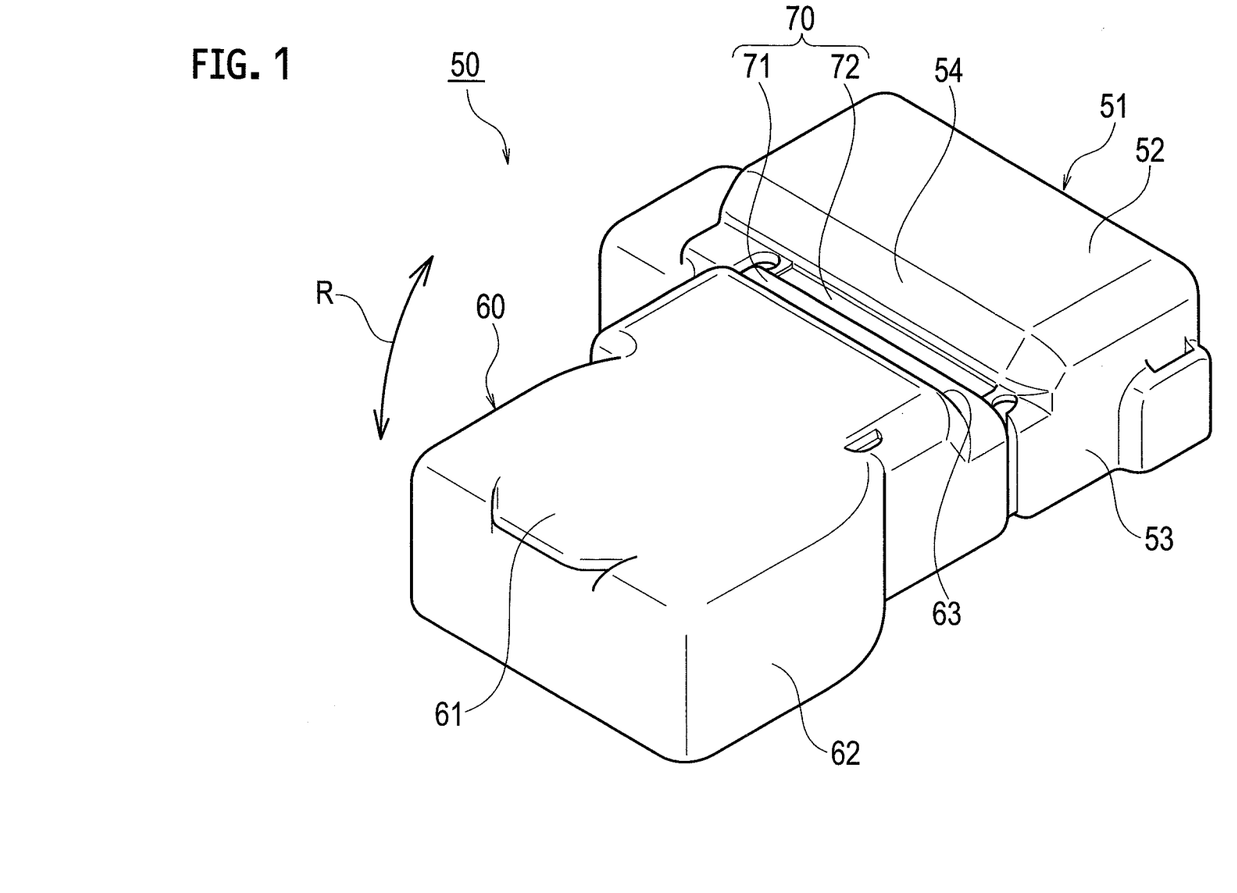
FIG. 1 is a perspective view of a conventional battery cover.
Figure 2:
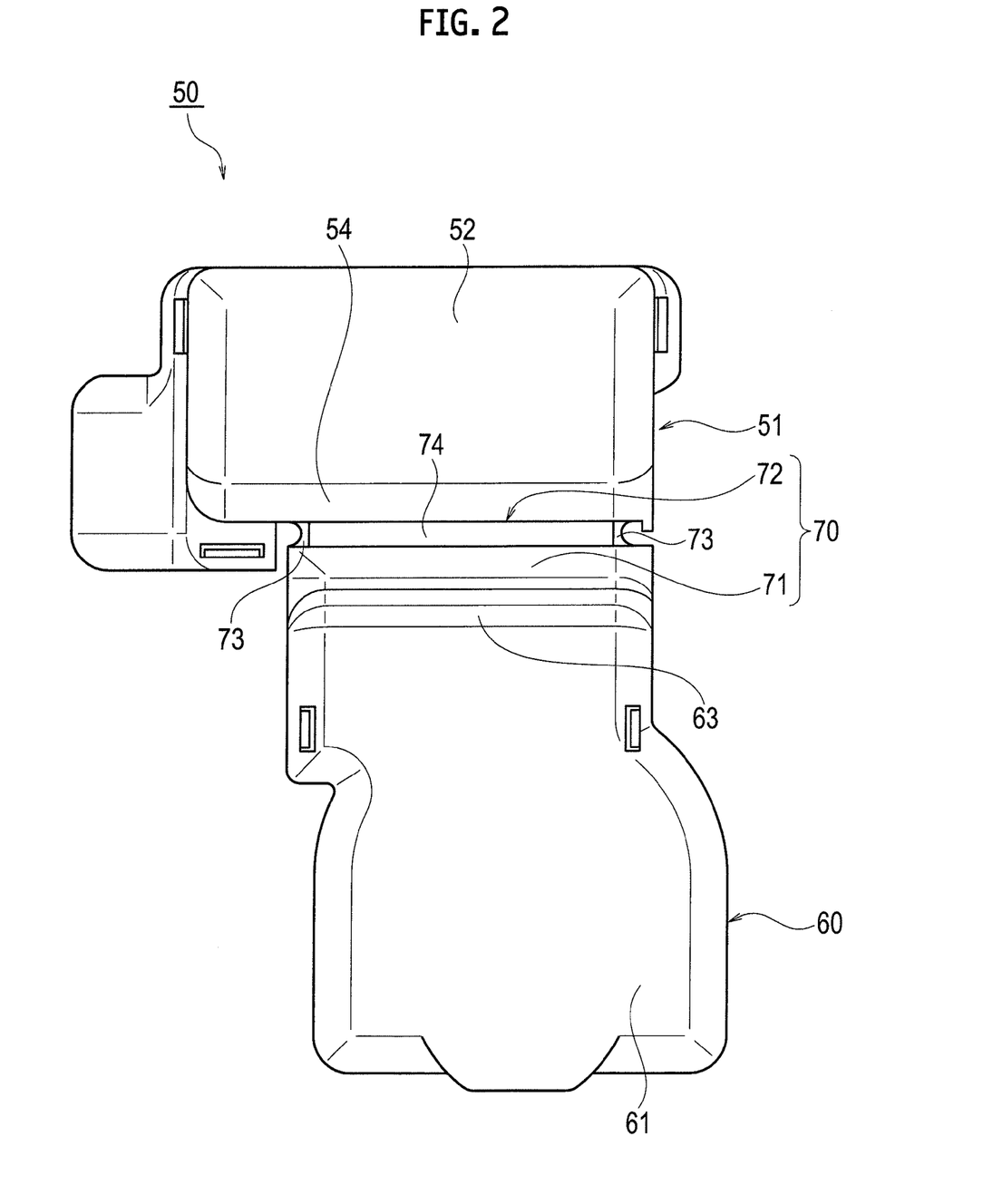
FIG. 2 is a plan view of the conventional battery cover.

A conventional example of this type of battery cover is shown in FIGS. 1 to 4B. As shown in FIGS. 1 and 2, this battery cover 50 includes a first cover portion 51, a second cover portion 60 and a coupling portion 70 arranged between the first cover portion 51 and the second cover portion 60.

The first cover portion 51 has a first upper surface wall 52 and a first side surface wall 53 that is arranged to extend downward from three edges of the first upper surface wall 52. A portion of the first upper surface wall 52 on the side of the second cover portion 60 forms a first inclination surface portion 54 that is inclined downward.

The second cover portion 60 has a second upper surface wall 61 and a second side surface wall 62 that is arranged to extend downward from three edges of the second upper surface wall 61. A portion of the second upper surface wall 61 on the side of the first cover portion 51 forms a second inclination surface portion 63 that is inclined downward.

The coupling portion 70 is arranged in a position that is lower than the upper surfaces of the first cover portion 51 and the second cover portion 60. The coupling portion 70 is formed with: a connection portion 71 that is provided integrally with the second cover portion 60; and a hinge portion 72 that is fixed to one side end of the connection portion 71.

Figure 3:
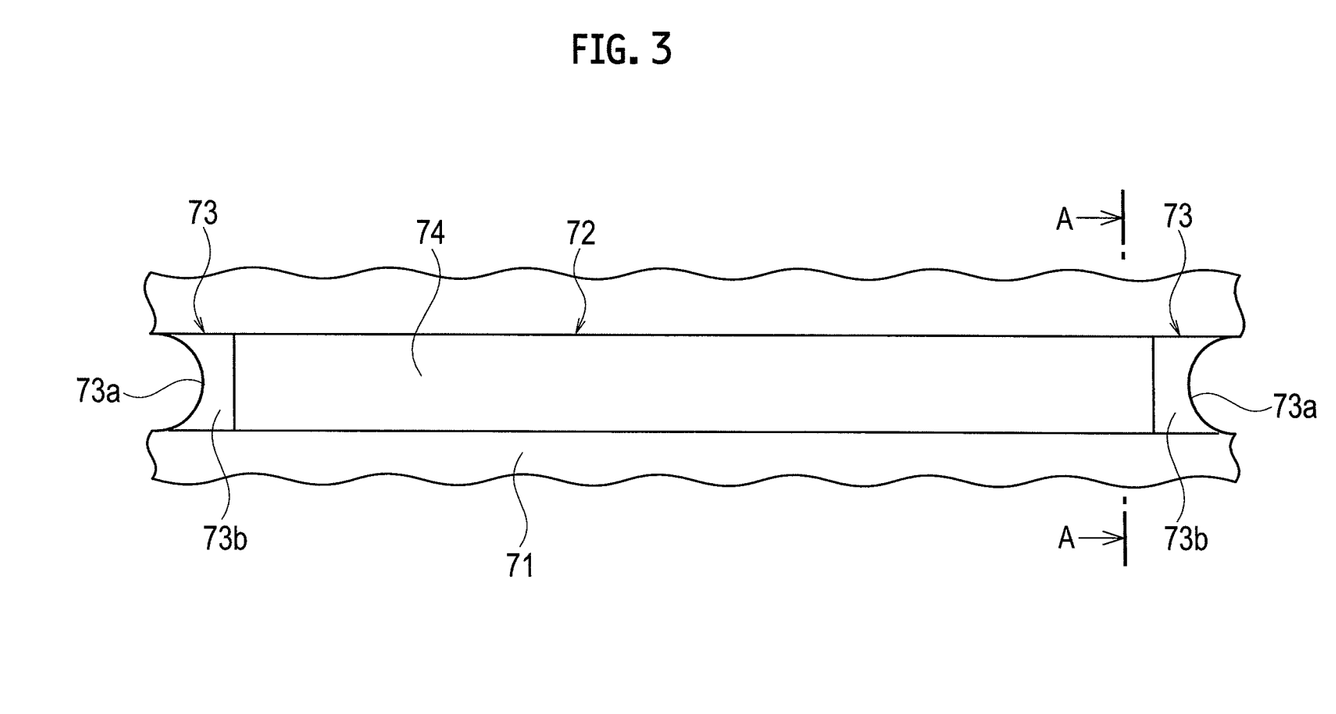
FIG. 3 is a plan view of the vicinity of a coupling portion of the conventional battery cover.
Figure 4A:
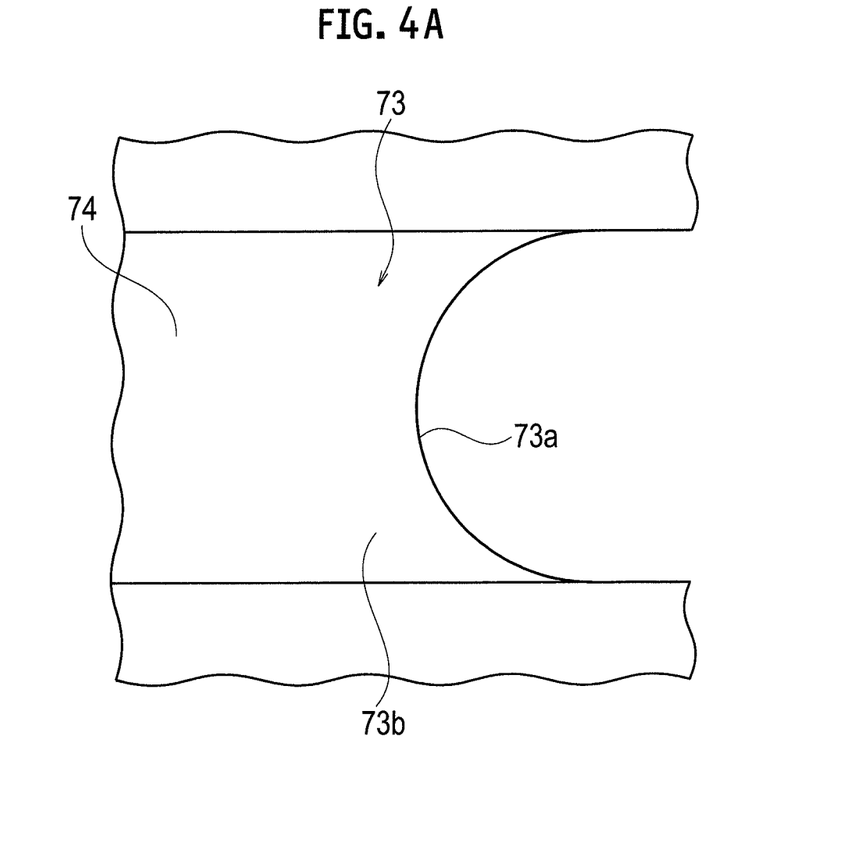
FIG. 4A is an enlarged plan view of a conventional hinge end portion.
Figure 4B:
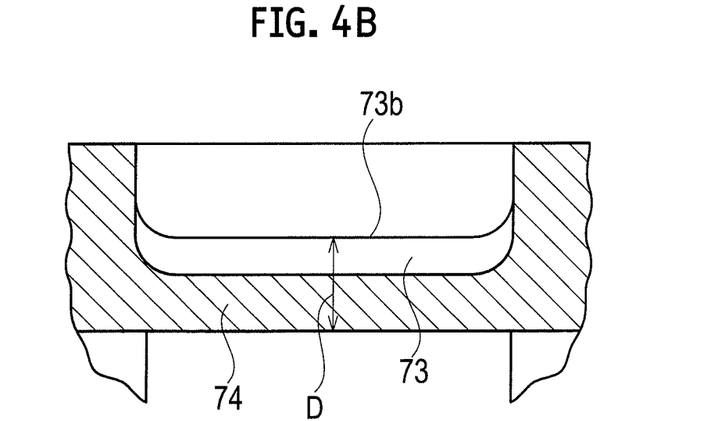
FIG. 4B is a cross-sectional view taken along line A-A of FIG. 3.

As shown in detail in FIGS. 3 to 4B, the hinge portion 72 is thinner than the connection portion 71 so as to be flexible, and hinge end portions 73 on both sides in its width direction are thicker than a hinge center portion 74. The side end surface 73a of each hinge end portion 73 is formed to have a semicircular shape that is concave toward the center side, when viewed from above (in plan view). The upper surface 73b of each hinge end portion 73 is formed to be substantially flat when viewed from the side (in side view).

In the conventional example described above, since the coupling portion 70 is arranged in the position that is lower than the upper surfaces of the first cover portion 51 and the second cover portion 60, the second cover portion 60 can rotate only to a position where the first inclination surface portion 54 hits against the second inclination surface portion 63. Thus, the rotation range of the second cover portion 60 is limited to a necessary rotation range.

Moreover, in the structure of the hinge portion 72, the hinge end portions 73 on both sides are formed to be thicker than the hinge center portion 74, and thus the strength of the hinge portion 72 is increased.

CITATION LIST

Patent Literature

[PTL1] Japanese Unexamined Patent Application Publication No. 2002-289171

SUMMARY OF INVENTION

Technical Problem

However, in the conventional example described above, as compared with a battery cover that has only the hinge portion 72 between the first cover portion 51 and the second cover portion 60, the hinge portion 72 disadvantageously has a low strength. In other words, since not only the hinge portion 72 but also the connection portion 71 is provided between the first cover portion 51 and the second cover portion 60, its structure has a low strength as compared with that of the hinge portion 72. When the rotation of the second cover portion 60 causes the first inclination surface portion 54 to hit against the second inclination surface portion 63, its reaction force acts on the coupling portion 70, and thus the hinge portion 72, which is the thinnest in the coupling portion 70, receives a large load damage. For this reason, the hinge portion 72 probably has a low strength.

Here, it can be considered that the thickness of the hinge end portions 73 on both sides of the hinge portion 72 is further increased and thus the strength is increased; however, the flexibility property of the hinge portion 72 is degraded, and thus it is impossible to increase the thickness beyond a predetermined thickness.

Hence, the present invention is made to overcome the above problem; an object of the present invention is to provide a cover in which a connection portion and a hinge portion are arranged in a position lower than the upper surfaces of a first cover portion and a second cover portion and which can increase the strength of the hinge portion without degrading the flexibility property of the hinge portion.

Solution to Problem

According to the present invention, there is provided a cover including: a first cover portion; a second cover portion; and a coupling portion that is arranged in a position lower than upper surfaces of the first cover portion and the second cover portion, between the first cover portion and the second cover portion, wherein the coupling portion includes a connection portion that is fixed to at least any one of the first cover portion and the second cover portion and a hinge portion that is thinner than the connection portion, the second cover portion is provided rotatably with respect to the first cover portion using the hinge portion as a supporting point for rotation, the hinge portion is provided such that hinge end portions on both sides are thicker than a hinge center portion, and each of the hinge end portions is formed such that a side end surface thereof is a curved surface which is gently inclined from a side of the first cover portion to a side of the second cover portion and that an upper surface thereof is formed into a substantially arc-shaped curved surface which is thinnest in its center and inclined upward to gradually become thicker from the center toward both support ends.

Preferably, a dimension of the hinge portion in a coupling direction is 3 mm, and a dimension from an upper surface of the connection portion to a center position of the hinge end portion that is lowest is 0.75 mm, the side end surface of the hinge end portion is formed into a curved surface such that the amount of shift of inclination between the support end on the side of the first cover portion and the support end on the side of the second cover portion in a width direction falls within a range of 0.2 mm to 0.6 mm, and the upper surface of the hinge end portion is formed into a curved surface such that a position 0.2 mm to 0.4 mm downward from the upper surface of the connection portion is the support end.

More preferably, a dimension of the hinge portion in a coupling direction is 3 mm, and a dimension from an upper surface of the connection portion to a center position of the hinge end portion that is lowest is 0.75 mm, the side end surface of the hinge end portion is formed into a curved surface such that the amount of shift of inclination between the support end on the side of the first cover portion and the support end on the side of the second cover portion in a width direction is 0.3 mm, and the upper surface of the hinge end portion is formed into a curved surface such that a position 0.3 mm downward from the upper surface of the connection portion is the support end.

Advantageous Effects of Invention

According to the present invention, although, when a lateral load acts on the second cover portion, the maximum stress is produced in the hinge end portions on both sides of the hinge portion, since the hinge end portion is thicker than the hinge center portion, it is possible to reduce the maximum stress value. Since the side end surface of the thicker hinge end portion is a gently inclined curved surface, stress concentration resulting from the rapid change of the shape of the hinge end portion is not produced.

Since the hinge end portion is thinnest in the center position, the hinge end portion is formed to have such a thickness that the flexibility property of the hinge portion is not degraded in the center position, and thus it is possible to maintain the desired flexibility property.

On the other hand, the thicker hinge end portion gradually becomes thicker from the center position toward the support ends on both sides, and thus it is possible to increase the strength. As described above, it is possible to increase the strength of the hinge portion without degrading the flexibility property of the hinge portion.

DESCRIPTION OF EMBODIMENTS

An embodiment of the present invention will be described below with reference to accompanying drawings.

Embodiment

Figure 5:
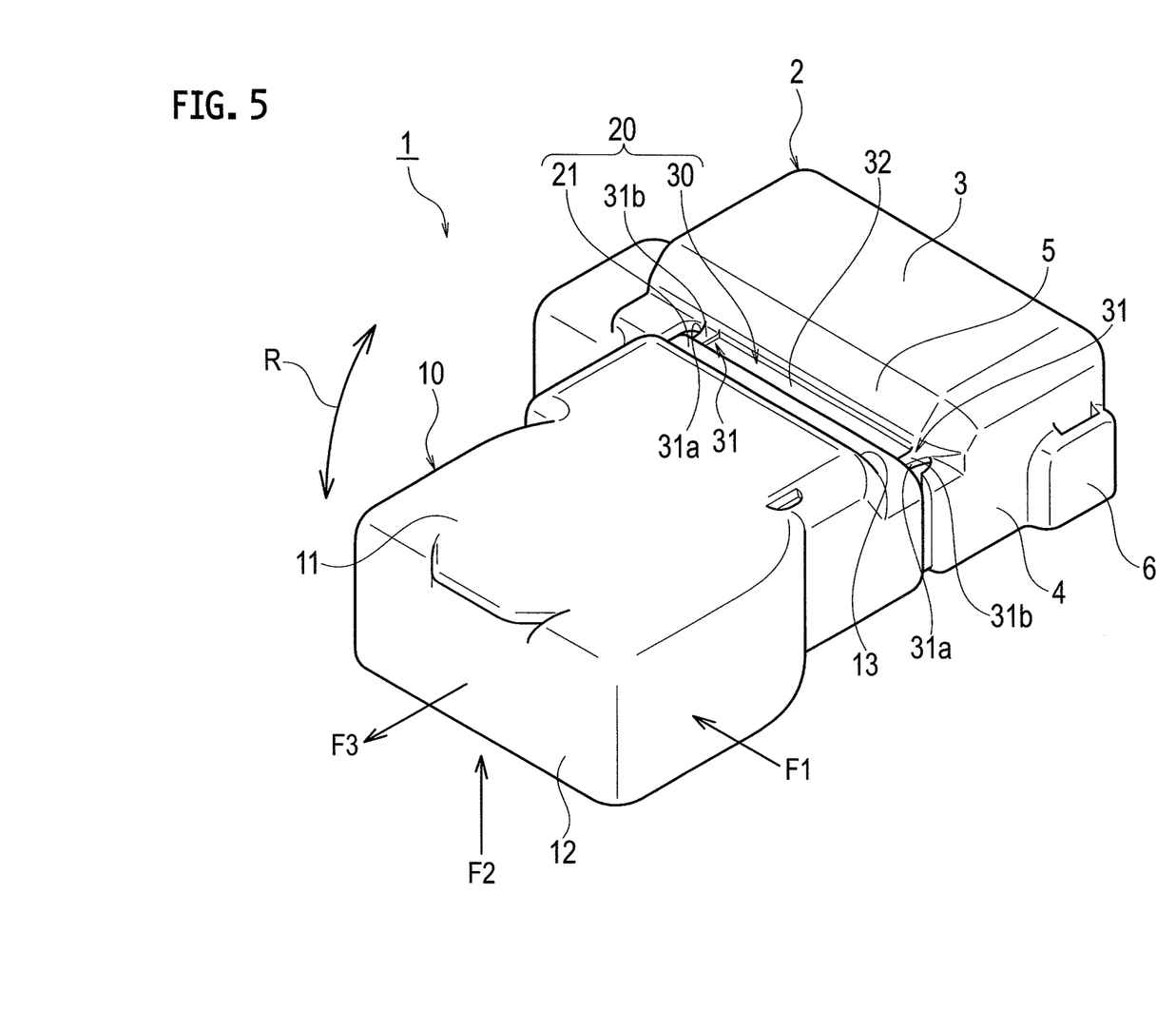
FIG. 5 is a perspective view of a battery cover according to an embodiment of the present invention.
Figure 6:
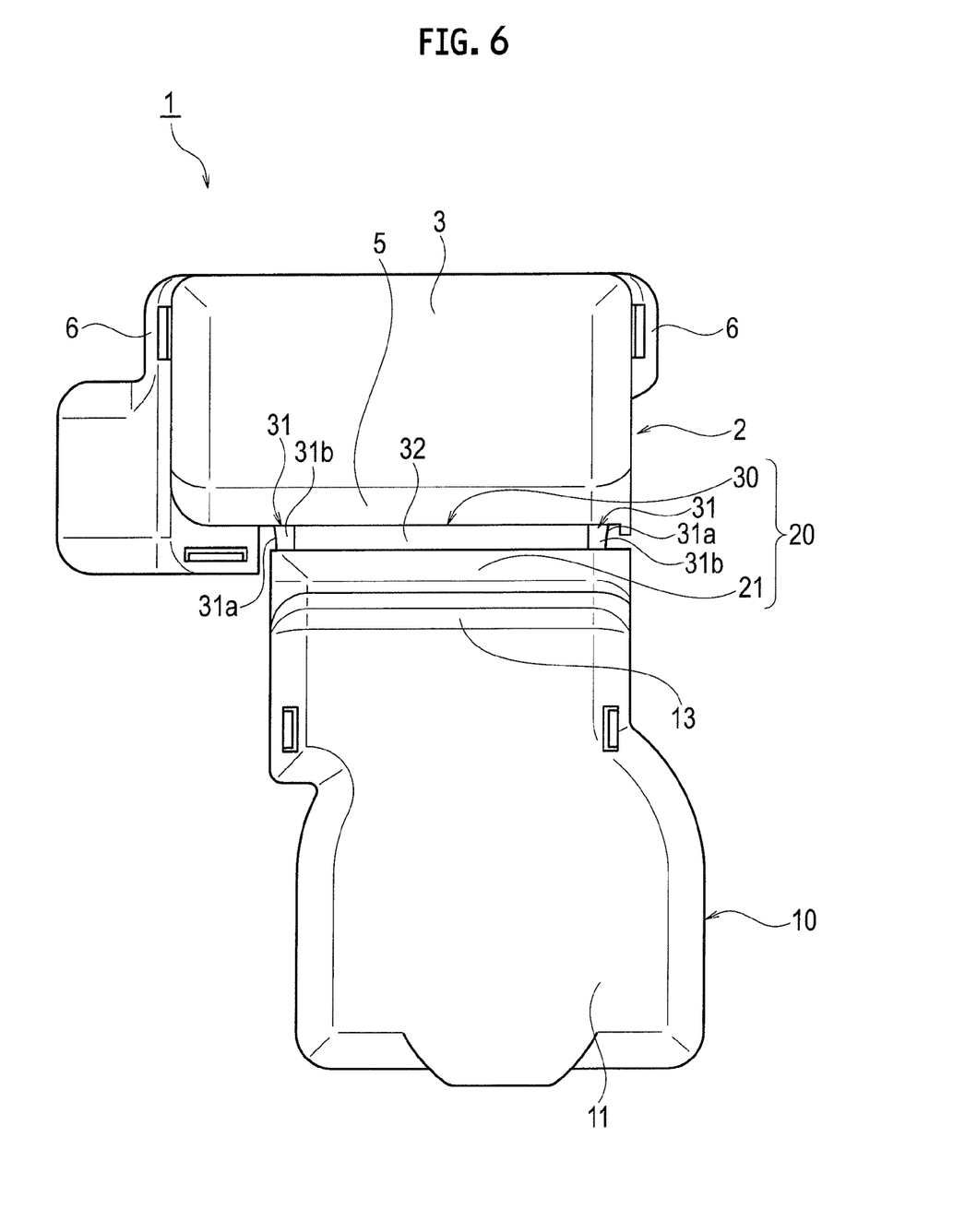
FIG. 6 is a plan view of the battery cover according to the embodiment of the present invention.

As shown in FIGS. 5 and 6, a battery cover 1 that is a cover includes a first cover portion 2, a second cover portion 10 and a coupling portion 20 that is arranged between the first cover portion 2 and the second cover portion 10.

The first cover portion 2 includes a first upper surface wall 3 and a first side surface wall 4 that is arranged to extend downward from three edges of the first upper surface wall 3. A portion of the first upper surface wall 3 on the side of the second cover portion 10 forms a first inclination surface portion 5 that is inclined downward. On the first side surface wall 4, a plurality of latch portions 6 is provided. The latch portions 6 fix the first cover portion 2 to a fuse unit (not shown).

The second cover portion 10 includes a second upper surface wall 11 and a second side surface wall 12 that is arranged to extend downward from three edges of the second upper surface wall 11. A portion of the second upper surface wall 11 on the side of the first cover portion 2 forms a second inclination surface portion 13 that is inclined downward.

The coupling portion 20 is arranged in a position that is lower than the upper surfaces of the first cover portion 2 and the second cover portion 10. The coupling portion 20 is formed with: a connection portion 21 that is provided integrally with the second cover portion 10; and a hinge portion 30 that is integrally fixed to the connection portion 21. In the battery cover 1, the second cover portion 10 is rotatable with respect to the first cover portion 2 using the hinge portion 30 as a supporting point for rotation.

Figure 7:
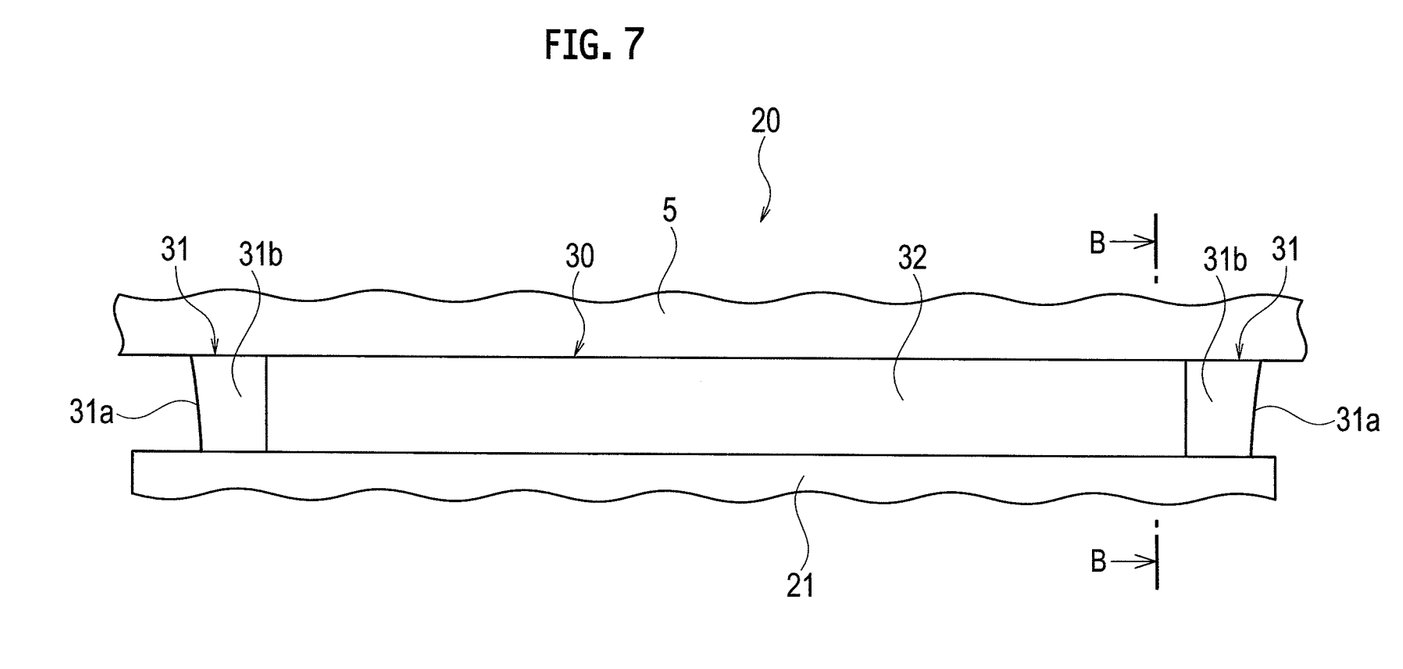
FIG. 7 is a plan view of the vicinity of a coupling portion of the battery cover according to the embodiment of the present invention.
Figure 8A:
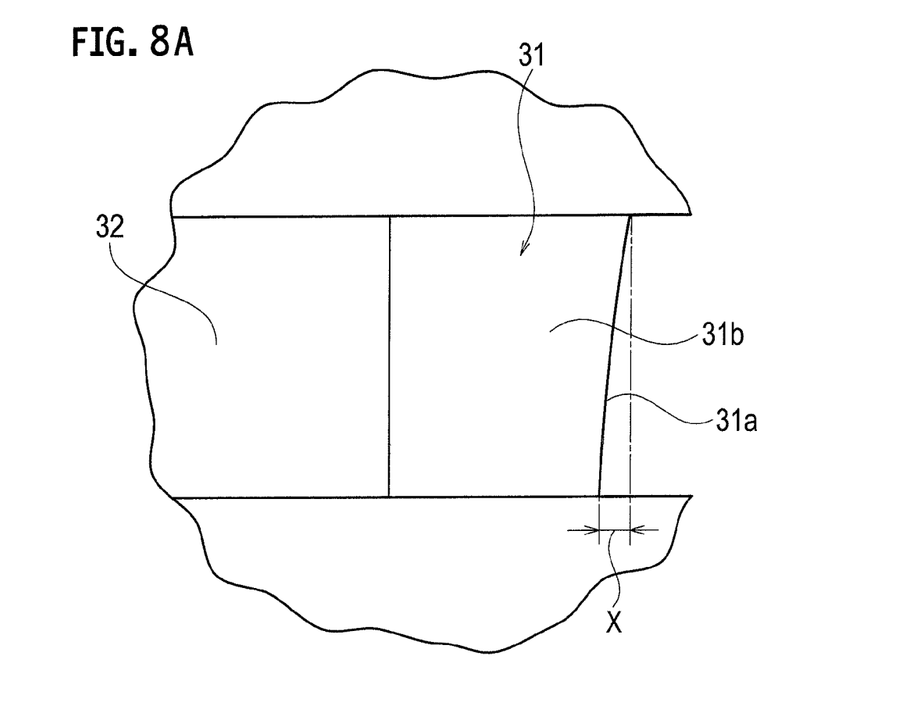
FIG. 8A is an enlarged plan view of a hinge end portion according to the embodiment of the present invention.
Figure 8B:
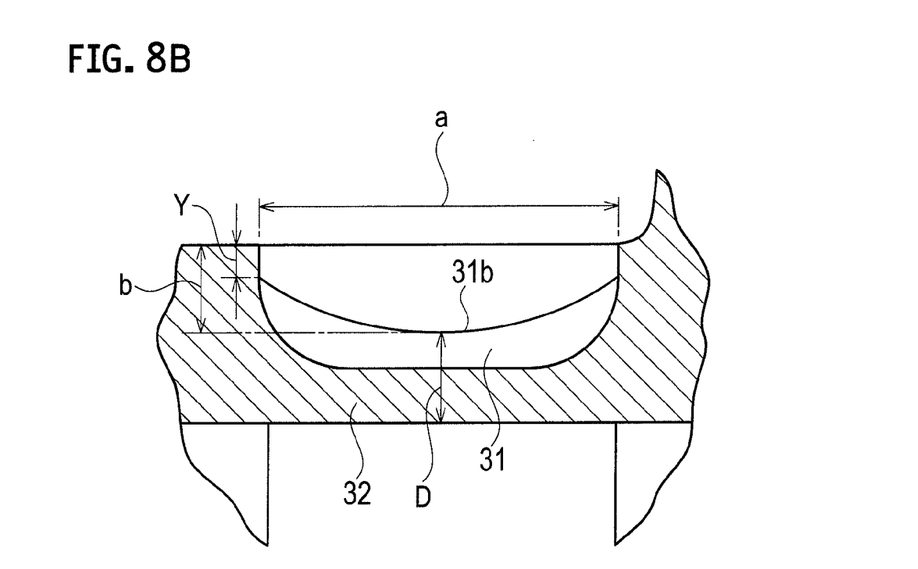
FIG. 8B is a cross-sectional view taken along line B-B of FIG. 7.

As shown in detail in FIGS. 7 to 8B, the hinge portion 30 is thinner than the connection portion 21 so as to be flexible. In the hinge portion 30, hinge end portions 31 on both sides in its width direction are thicker than a hinge center portion 32. The side end surface 31a of each hinge end portion 31 is formed such that, when viewed from above (in plan view), the side end surface 31a is a curved surface which is gently inclined from the side of the first cover portion 2 to the side of the second cover portion 10. The upper surface 31b of the hinge portion 30 is formed such that, when viewed from the side (in side view), the upper surface 31b is a substantially arc-shaped curved surface which is lowest in its center and gradually inclined upward from the center toward support ends on both sides. In other words, the hinge end portion 31 is formed such that it is thinnest in its center part and gradually becomes thicker from the center toward the support ends on both sides.

Here, a dimension "a" of the hinge portion 30 in the coupling direction is 3 mm, and a dimension "b" from the upper surface of the connection portion 21 to the center position that is lowest in the hinge end portion 31 is 0.75 mm. The side end surface 31a of the hinge end portion 31 is formed into a gently curved surface such that the amount of shift of the inclination between the support end on the side of the first cover portion 2 and the support end on the side of the second cover portion 10 (the side of the connection portion 21) in the width direction is 0.3 mm, and the upper surface 31b of the hinge end portion 31 is formed into a substantially arc-shaped curved surface such that a position 0.3 mm downward from the upper surface of the connection portion 21 is the support end.

In the configuration described above, the second cover portion 10 is rotatable in a direction of an arrow "R" (shown in FIG. 5) with respect to the first cover portion 2 using the hinge portion 30 as the supporting point for rotation, and shifts between a closed position and an open position by this rotation. In the closed position, the first upper surface wall 3 and the second upper surface wall 11 are arranged on the same surface, and cover the upper portions of the fuse unit (not shown) and the like. In the open position, the upper portions of the fuse unit (not shown) and the like that are closed by the second upper surface wall 11 are exposed. Thus, for example, it is possible to visually identify the fuse (not shown). Since the coupling portion 20 is arranged in the position that is lower than the upper surfaces of the first cover portion 2 and the second cover portion 10, the second cover portion 10 can rotate only to a position where the first inclination surface portion 5 hits against the second inclination surface portion 13. In this way, the rotation range of the second cover portion 10 is limited to a necessary rotation range.

As described above, in the hinge portion 30 of the battery cover 1, the hinge end portions 31 on both sides are thicker than the hinge center portion 32; the side end surface 31a of each hinge end portion 31 is formed such that the side end surface 31a is a curved surface which is gently inclined from the side of the first cover portion 2 to the side of the second cover portion 10; and the upper surface 31b is formed such that the upper surface 31b is a substantially arc-shaped curved surface which is lowest in its center and gradually inclined upward from the center toward the support ends on both sides. Therefore, although, when a lateral load acts on the second cover portion 10, the maximum stress is produced in the hinge end portions 31 on both sides of the hinge portion 30, since the hinge end portion 31 is thicker than the hinge center portion 32, it is possible to reduce the maximum stress value. Since the side end surface 31a of the thicker hinge end portion 31 is a gently inclined curved surface, stress concentration resulting from the rapid change of the shape of the hinge end portion 31 is not produced. Since the hinge end portion 31 is thinnest in the center position, the hinge end portion 31 is formed to have such a thickness that the flexibility property of the hinge portion 30 is not degraded in the center position, and thus it is possible to maintain the desired flexibility property. On the other hand, the thicker hinge end portion 31 gradually becomes thicker from the center position toward the support ends on both sides, and thus it is possible to increase the strength. As described above, it is possible to increase the strength of the hinge portion 30 without degrading the flexibility property of the hinge portion 30.

[Measurement of Stress Distribution]

The stress distribution of the hinge portion 30 when the structure of the hinge end portion 31 of the hinge portion 30 was changed differently was experimentally measured. For example, the stress distribution was measured by producing the battery cover 1 with a photoelastic member, applying a load to the second cover portion 10 of the battery cover 1 and observing the images of the resulting stresses acting on the hinge portion 30. As the stresses acting on the battery cover 1, on the second cover portion 10 on the side of the rotation, a load in a lateral direction (hereinafter referred to as a lateral load F1), a load in an open direction (hereinafter referred to as an open load F2) and a load in a tensile direction (a tensile load F3) can be considered, and thus the above loads were applied.

Here, in the model of the battery cover 1, a dimension "a" of the hinge portion 30 in the coupling direction is 3 mm, and a dimension "b" from the upper surface of the connection portion 21 to the center position that is lowest in the hinge end portion 31 is 0.75 mm.

Figure 9:
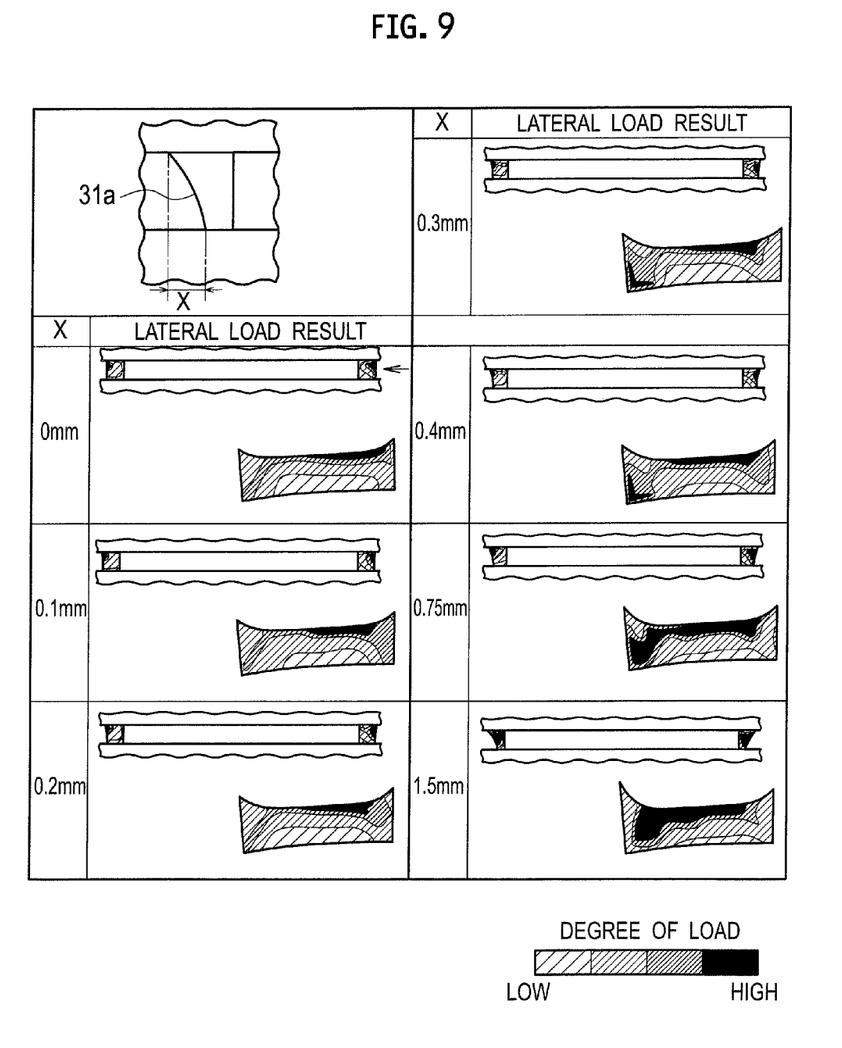
FIG. 9 is an observation diagram of the stress distribution when the upper surface of the hinge end portion is substantially flat, and the amount of inclination X of its side end surface is changed and thus a lateral load is applied.

First, under a condition where the upper surface 31b of the hinge end portion 31 was substantially flat, the stress distribution was observed by changing the amount of inclination X of the side end surface 31a. Then, when the lateral load F1 was applied, the stress distribution shown in FIG. 9 was obtained. As a result of the measurement, it has been recognized by the experiment that the stress acting on the hinge portion 30 was changed by the amount of inclination X of the side end surface 31a of the hinge end portion 31. The degree of the load of each portion is represented in four stages. The area of the highest load is painted in black; as the load becomes lower, an area is represented by a lower degree of hatching. In the following experiments, the criteria of evaluation are the same.

Figure 10:
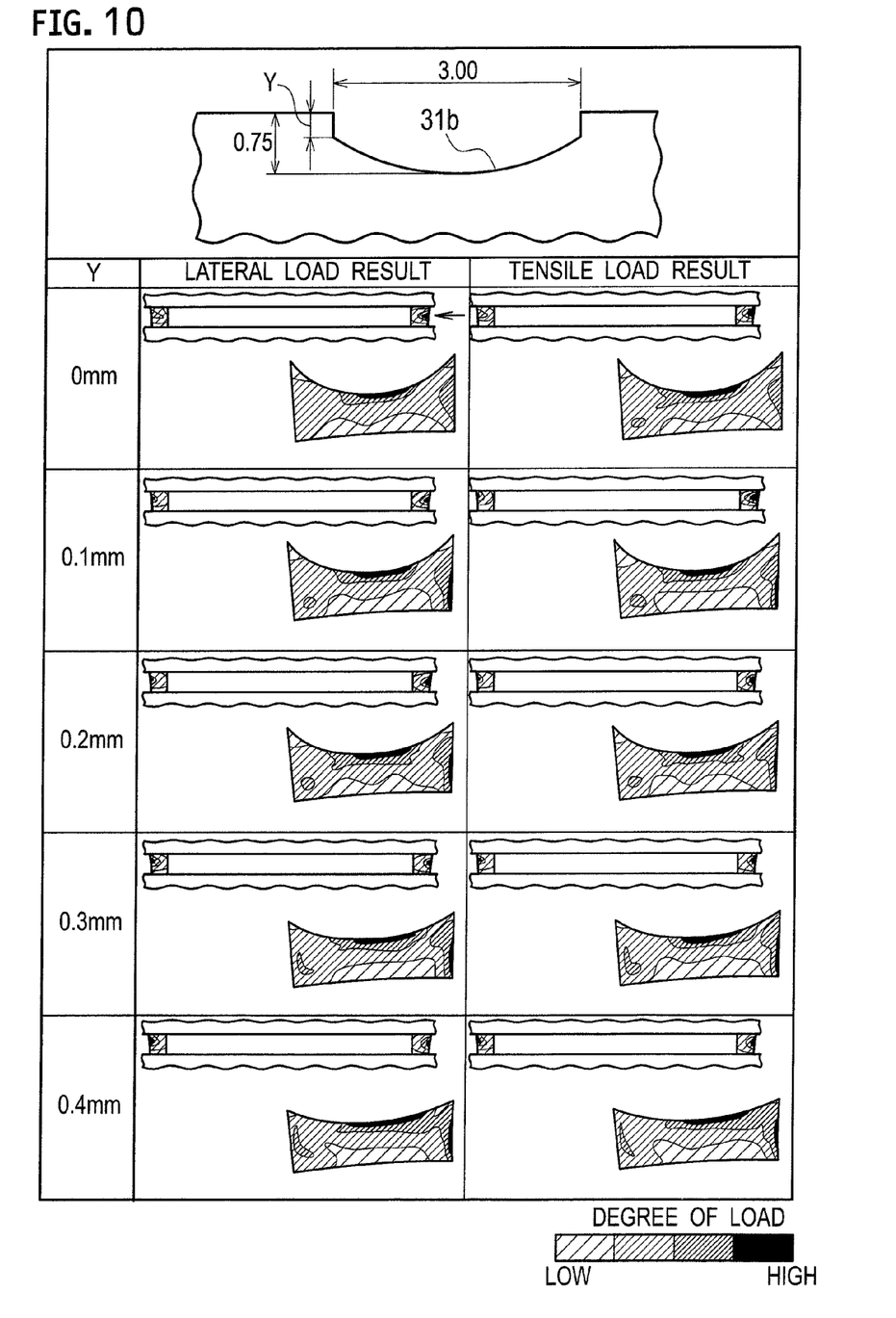
FIG. 10 is an observation diagram of the stress distribution when the side end surface of the hinge end portion is substantially flat, and the degree of substantially arc-shape of its upper surface is changed and thus a lateral load and a tensile load are applied.

Then, under a condition where the side end surface 31a of the hinge end portion 31 was a substantially flat surface, the stress distribution was observed by changing the degree of curved surface of the upper surface 31b. Specifically, a dimension "Y" from the upper surface of the connection portion 21 to the support end was changed. Then, in each case of the lateral load F1 and the tensile load F3, the stress distribution shown in FIG. 10 was obtained. As a result of the observation, it has been recognized by the experiment that the stress acting on the hinge portion 30 was changed by the degree of curved surface (the degree of curved surface was changed by "Y") of the upper surface 31b of the hinge end portion 31.

Figure 11:
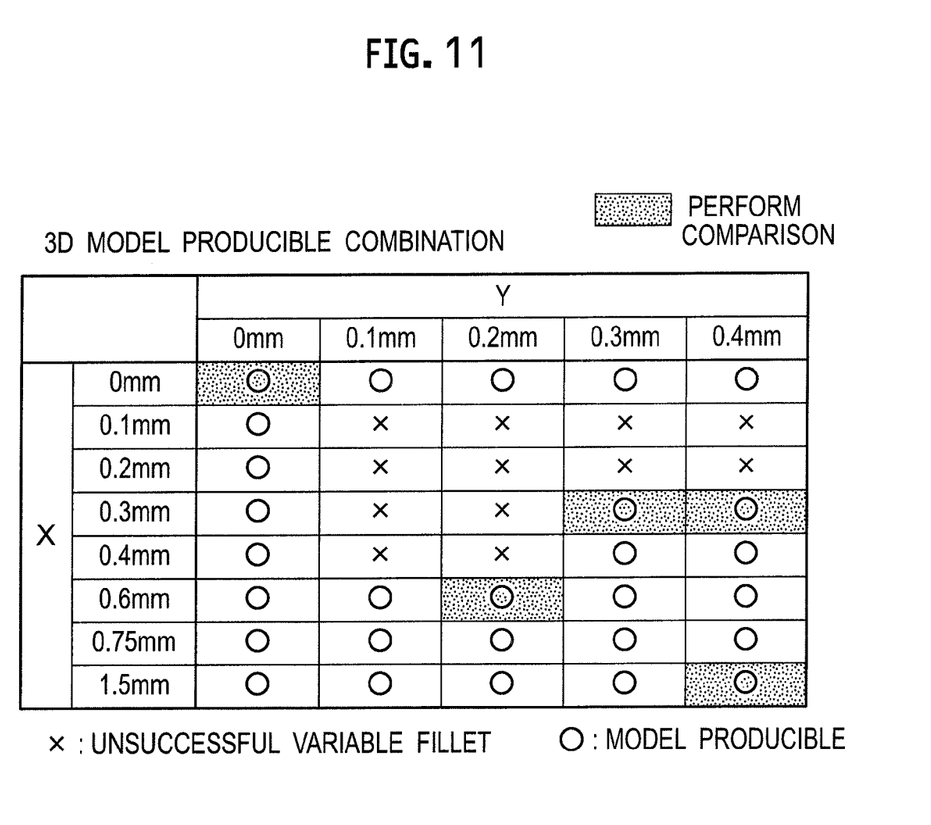
FIG. 11 is a list showing whether or not the model of the battery cover obtained by changing both the amount of inclination X of the side end surface of the hinge end portion and the degree of arc Y of the upper surface is successfully formed.

Hence, as shown in FIG. 11, several types (mesh lines) of models of the battery cover 1 were produced by changing the amount of inclination "X" of the side end surface 31a of the hinge end portion 31 and the degree of arc "Y" of the upper surface 31b. The stress distribution of each of the models of the battery cover 1 was observed. Then, in each case of the lateral load F1, the open load F2 and the tensile load F3, the stress distribution shown in FIG. 12 was obtained.

Figure 12:
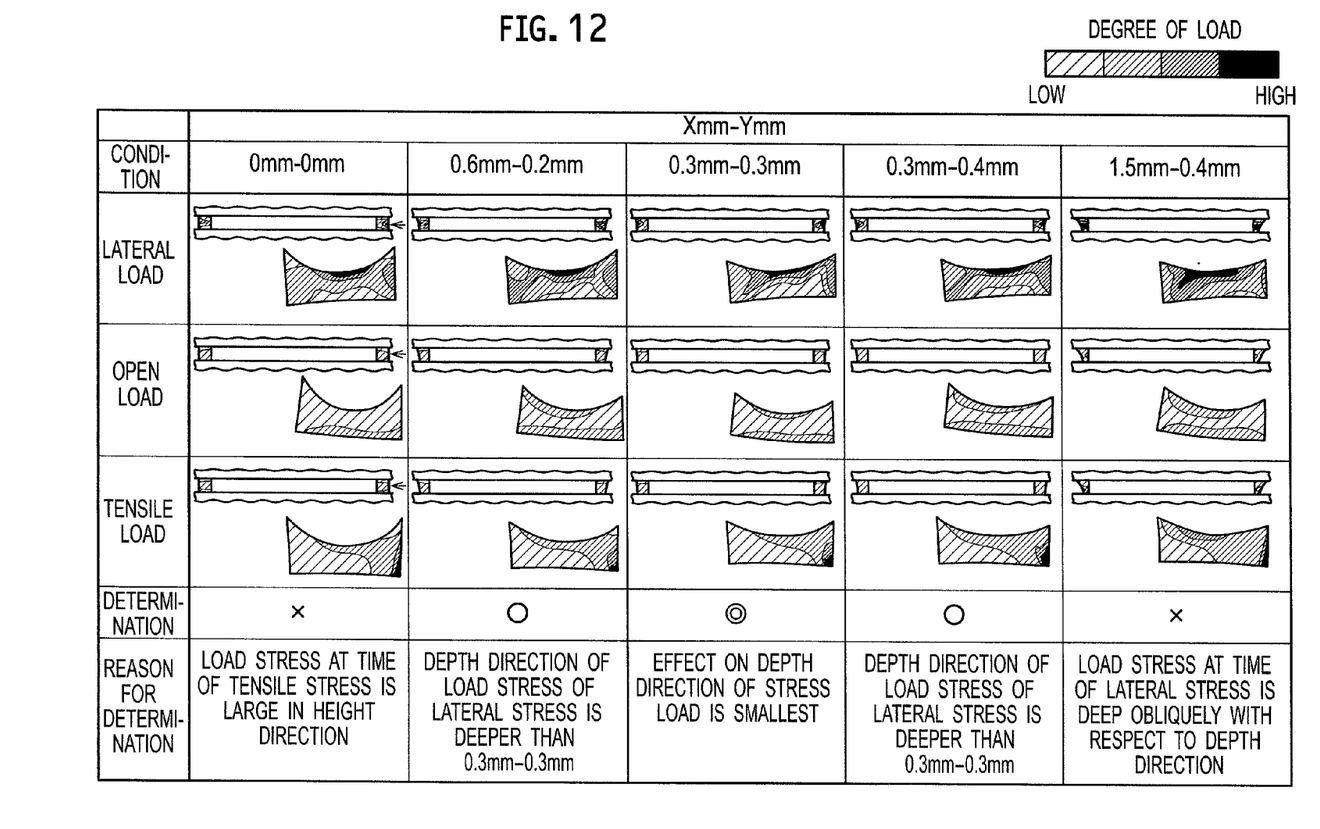
FIG. 12 is an observation diagram of the stress distribution when, in each model of the battery cover, a lateral load, an open load and a tensile load are applied.

As a result of the observation, it has been recognized that, preferably, the side end surface 31a of the hinge end portion 31 was formed into a gently curved surface such that the amount of shift of the inclination between the support end on the side of the first cover portion 2 and the support end on the side of the second cover portion 10 (the side of the connection portion 21) in the width direction fell within a range of 0.2 mm to 0.6 mm, and the upper surface 31b of the hinge end portion 31 was formed into a substantially arc-shaped curved surface such that a position 0.2 mm to 0.4 mm downward from the upper surface of the connection portion 21 was the support end.

Moreover, as a result of the observation, it has been recognized that, more preferably, the side end surface 31a of the hinge end portion 31 was formed into a gently curved surface such that the amount of shift of the inclination between the support end on the side of the first cover portion 2 and the support end on the side of the second cover portion 10 (the side of the connection portion 21) in the width direction was 0.3 mm, and the upper surface 31b of the hinge end portion 31 was formed into a substantially arc-shaped curved surface such that a position 0.3 mm downward from the upper surface of the connection portion 21 was the support end.

Figure 13:
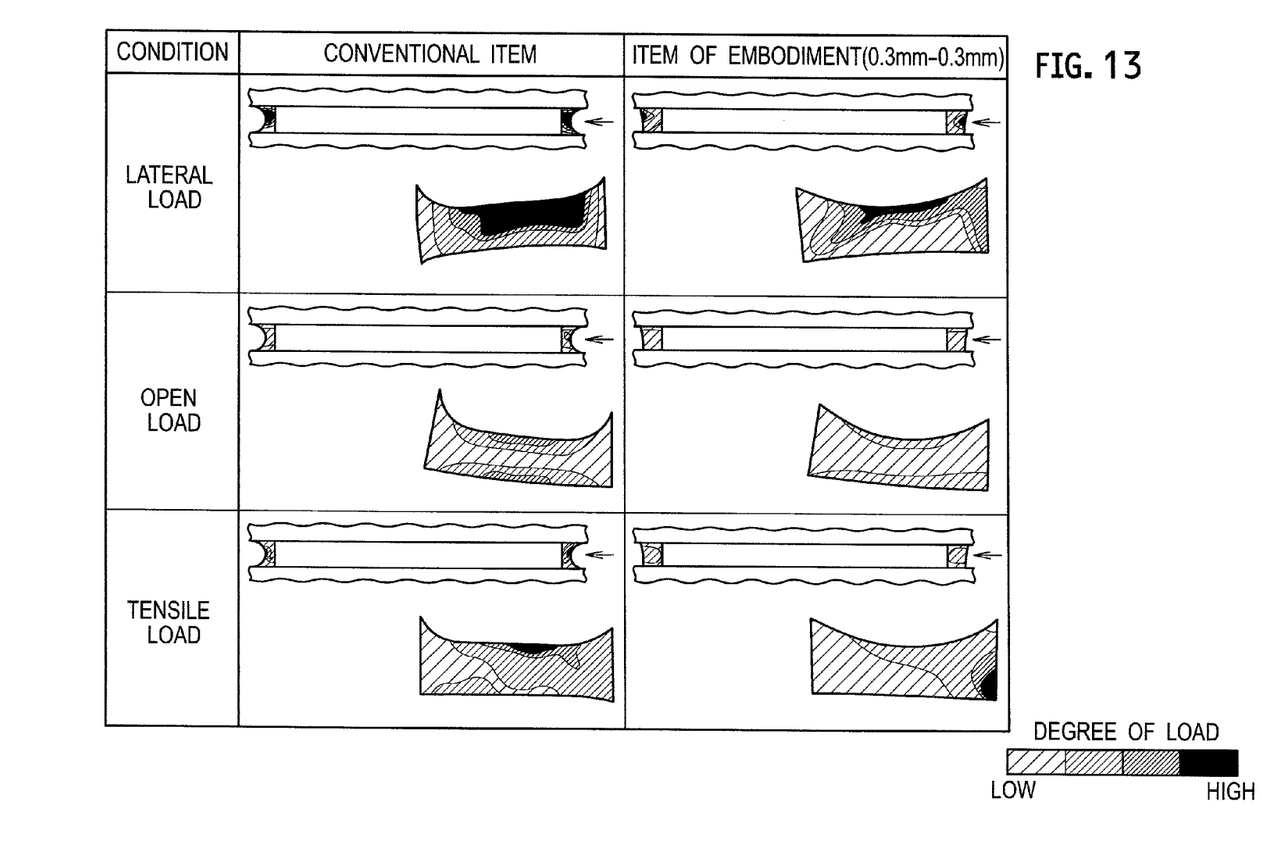
FIG. 13 is an observation diagram of the stress distribution when, in each model of a conventional battery cover and a battery cover of the embodiment, a lateral load, an open load and a tensile load are applied.

Finally, as shown in FIG. 13, the stress distribution of the model of the conventional example and the model of the present embodiment was observed. As a result of the measurement, it has been recognized that, in the model of the present embodiment, for substantially all of the loads, the degree of load (stress) was reduced. In particular, for the lateral load F1, the degree of load (stress) was significantly reduced.

When the lateral load F1 is applied, a large amount of compression stress and a large amount of tensile stress act on the hinge end portions 31 on both sides of the hinge portion 30. Since, in the conventional example, the side end surfaces of both ends of the hinge portion are semicircular, and their shapes are significantly changed, the stress is probably concentrated. By contrast, since, in the present embodiment, the side end surfaces are gently inclined surfaces, and their shapes are not significantly changed, the stress is not concentrated. For this reason, probably, for the lateral load F1, the degree of load (stress) was significantly reduced.

[Others]

Although, in the present embodiment, the connection portion 21 is provided on the side of the second cover portion 10, the connection portion 21 may be provided on the side of the first cover portion 2, or provided on both the side of the first cover portion 2 and the side of the second cover portion 10.

Although, in the present embodiment, the cover is the battery cover 1, the present invention is naturally applicable to a cover other than the cover described above.

REFERENCE SIGNS LIST 1 battery cover (cover)
2 first cover portion
10 second cover portion
20 coupling portion
21 connection portion
30 hinge portion
31 hinge end portion
31a side end surface
31b upper surface
32 hinge center portion

The invention claimed is:

1. A cover comprising:
a first cover portion;
a second cover portion; and
a coupling portion that is arranged in a position lower than upper surfaces of the first cover portion and the second cover portion, between the first cover portion and the second cover portion, wherein
the coupling portion includes a connection portion that is fixed to at least any one of the first cover portion and the second cover portion and a hinge portion that is thinner than the connection portion,
the second cover portion is provided rotatably with respect to the first cover portion using the hinge portion as a supporting point for rotation,
the hinge portion is provided such that hinge end portions on both sides are thicker than a hinge center portion, and
each of the hinge end portions decrease its width from a side of the first cover portion to a side of the second cover portion and is formed such that a side end surface of the hinge end portions is a curved surface which is gently inclined from a side of the first cover portion to a side of the second cover portion and that an upper surface of the hinge end portions is formed into a substantially arc-shaped curved surface which is thinnest in its center and inclined upward to gradually become thicker from the center toward both support ends.

2. The cover of claim 1, wherein
a dimension of the hinge portion in a coupling direction is 3 mm,
a dimension from an upper surface of the connection portion to a center position of the hinge end portions that are lowest is 0.75 mm,
the side end surface of the hinge end portions are formed into a curved surface such that an amount of shift of inclination between the support end on the side of the first cover portion and the support end on the side of the second cover portion in a width direction falls within a range of 0.2 mm to 0.6 mm, and
the upper surface of the hinge end portions are formed into a curved surface such that a position 0.2 mm to 0.4 mm downward from the upper surface of the connection portion is the support end.

3. The cover of claim 1, wherein
a dimension of the hinge portion in a coupling direction is 3 mm,
a dimension from an upper surface of the connection portion to a center position of the hinge end portions that are lowest is 0.75 mm,
the side end surface of the hinge end portions are formed into a curved surface such that an amount of shift of inclination between the support end on the side of the first cover portion and the support end on the side of the second cover portion in a width direction is 0.3 mm, and
the upper surface of the hinge end portions are formed into a curved surface such that a position 0.3 mm downward from the upper surface of the connection portion is the support end.

* * * * *